(12) United States Patent
von Erichsen

(10) Patent No.: US 6,443,425 B1
(45) Date of Patent: Sep. 3, 2002

(54) VALVE

(75) Inventor: Volker von Erichsen, Recklinghausen (DE)

(73) Assignee: NEM Power Systems (DE)

( * ) Notice: Subject to any disclaimer, the term of this patent is extended or adjusted under 35 U.S.C. 154(b) by 0 days.

(21) Appl. No.: 09/839,916

(22) Filed: Apr. 20, 2001

(30) Foreign Application Priority Data

Apr. 20, 2000 (DE) .......................................... 100 19 686

(51) Int. Cl.7 .............................................. F16K 31/44
(52) U.S. Cl. ...................... 251/279; 251/301; 137/875
(58) Field of Search ........................... 251/129.11, 248, 251/301, 398, 279; 137/875; 74/665; 454/363, 327

(56) References Cited

U.S. PATENT DOCUMENTS

| | | | |
|---|---|---|---|
| 3,916,949 A | * 11/1975 | Armstrong | ................... 251/301 |
| 4,821,507 A | * 4/1989 | Bachmann et al. | ...... 60/39.182 |
| 4,919,169 A | * 4/1990 | Bachmann et al. | ......... 137/875 |
| 5,101,853 A | * 4/1992 | Mailiet et al. | ............... 137/242 |
| 5,233,886 A | * 8/1993 | Bossler, Jr. | ................ 74/665 F |
| 5,697,596 A | * 12/1997 | Kremers et al. | ............... 251/58 |

* cited by examiner

*Primary Examiner*—Lesley D. Morris
*Assistant Examiner*—Patrick Buechner
(74) *Attorney, Agent, or Firm*—R W Becker & Associates; R W Becker

(57) ABSTRACT

A valve, especially a switch-over valve for large channel cross sections, is provided. A wing is pivotably mounted in a housing having channel connections. A fixating lever assembly provides for movement of the wing and includes a fixating lever and at least one link rod, one end of which is pivotably connected with the fixating lever while the other end is pivotably connected with the wing. A respective driver passes through and is mounted on opposite side walls of the housing. An inner end of each driver is connected to the fixating lever of a given one of the assemblies. A rotary drive mechanism engages an outer end of each driver.

4 Claims, 3 Drawing Sheets

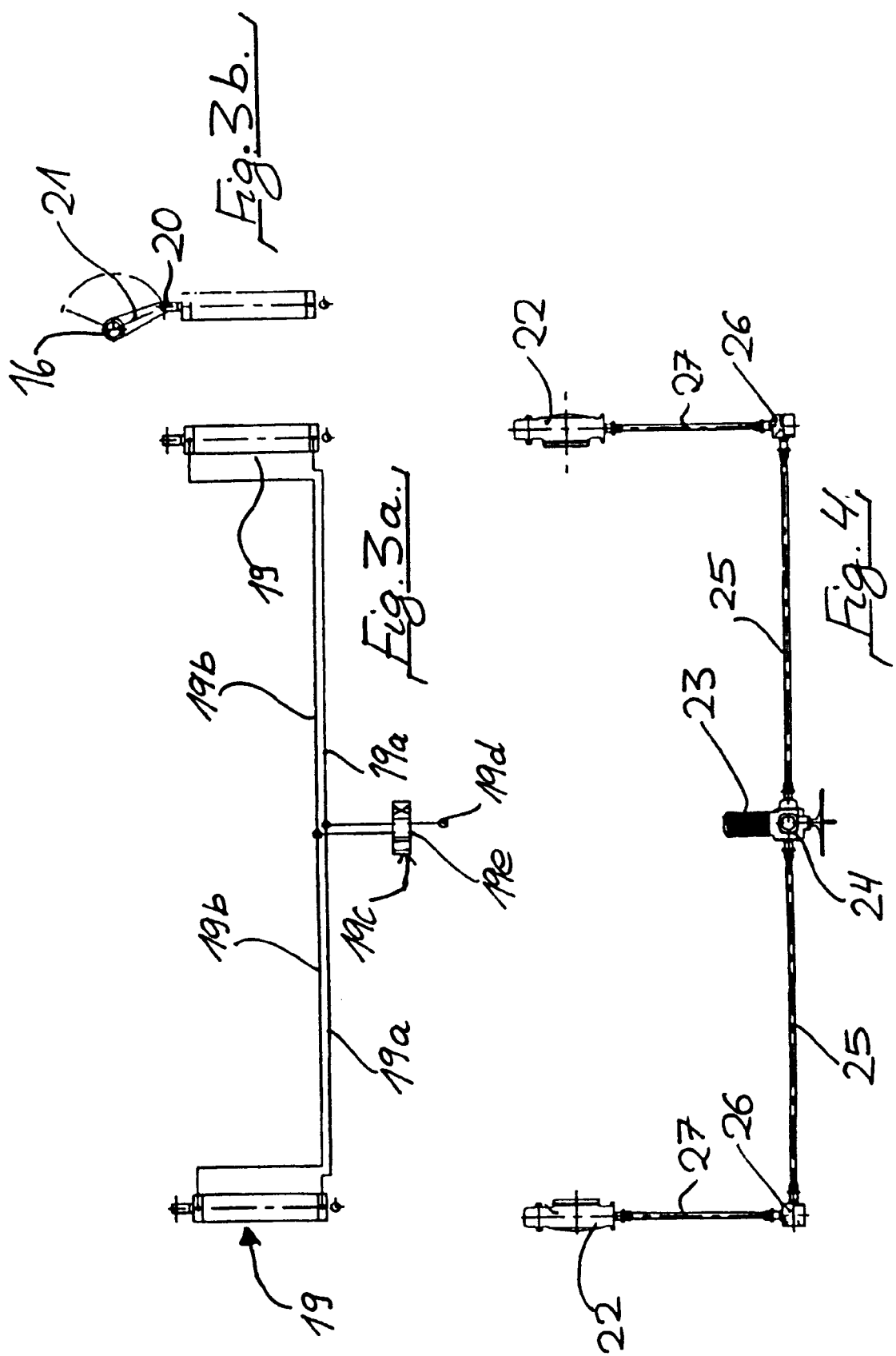

VALVE

BACKGROUND OF THE INVENTION

The present invention relates to a valve, especially switch-over valves for large channel cross sections. The valve has a housing that is provided with channel connections, and a wing that is pivotably mounted in the housing by means of an articulation and that can be driven by at least one drive shaft and a fixation lever assembly that comprises a fixation lever secured to the drive shaft and at least one link rod that is pivotably connected on the one hand with the fixation lever and on the other hand with the wing.

Large wing switch-over valves are utilized to shut off channels in installation components, such as in desulfurization and nitrogen removal plants, and enable a continuing operation of the boiler via a bypass channel, even if the desulfurization and/or nitrogen removal unit must be shut down due to operating conditions.

Large wing switch-over valves are also used in gas turbine plants between gas turbines and waste heat boilers or exchangers.

EP 0 707 176 B1 discloses a fixation lever switch-over valve for large capacity cross sections, according to which, in the region of the channel connection for a bypass channel, there is provided a drive shaft that extends transversely through the channel. Connected with the shaft is a fixation lever assembly in order to pivot the wing. The internal fixation lever shaft is offset on the articulation shaft by about ⅙ of the nominal inside diameter of the bypass channel into the cross section of the bypass channel. The fixation lever shaft therefore produces an additional pressure loss. If a power plant is operated nearly entirely via the desulfurization and/or nitrogen removal unit, as is the case in Europe, the bypass channel is generally closed and the fixation lever shaft that is disposed in the bypass channel does not lead to an additionally generated pressure loss during normal operation. For the short period of bypass operation, this can be disregarded.

However, this evaluation is different if the power plants, for example as in the United States, are operated for half a year via the flue gas treatment unit, and in the other half year via the bypass. With such an arrangement, the fixation lever shaft that is disposed in the free channel cross section generates a pressure loss that must constantly be overcome, and which can no longer be economically disregarded, since in particular for channels having a large cross section an average loss of up to 15 to 20% can occur due to the drive shaft.

It is therefore an object of the present invention to improve a valve of the aforementioned general type such that the average loss due to the valve drive is reduced.

BRIEF DESCRIPTION OF THE DRAWINGS

This object, and other objects and advantages of the present invention, will appear more clearly from the following specification in conjunction with the accompanying schematic drawings, in which:

FIGS. 3a show a piston/cylinder drive mechanism for the two and 3b fixating lever assemblies; and FIG. 4 shows an electromechanical drive arrangement for the two fixating lever assemblies.

SUMMARY OF THE INVENTION

Figure 1:
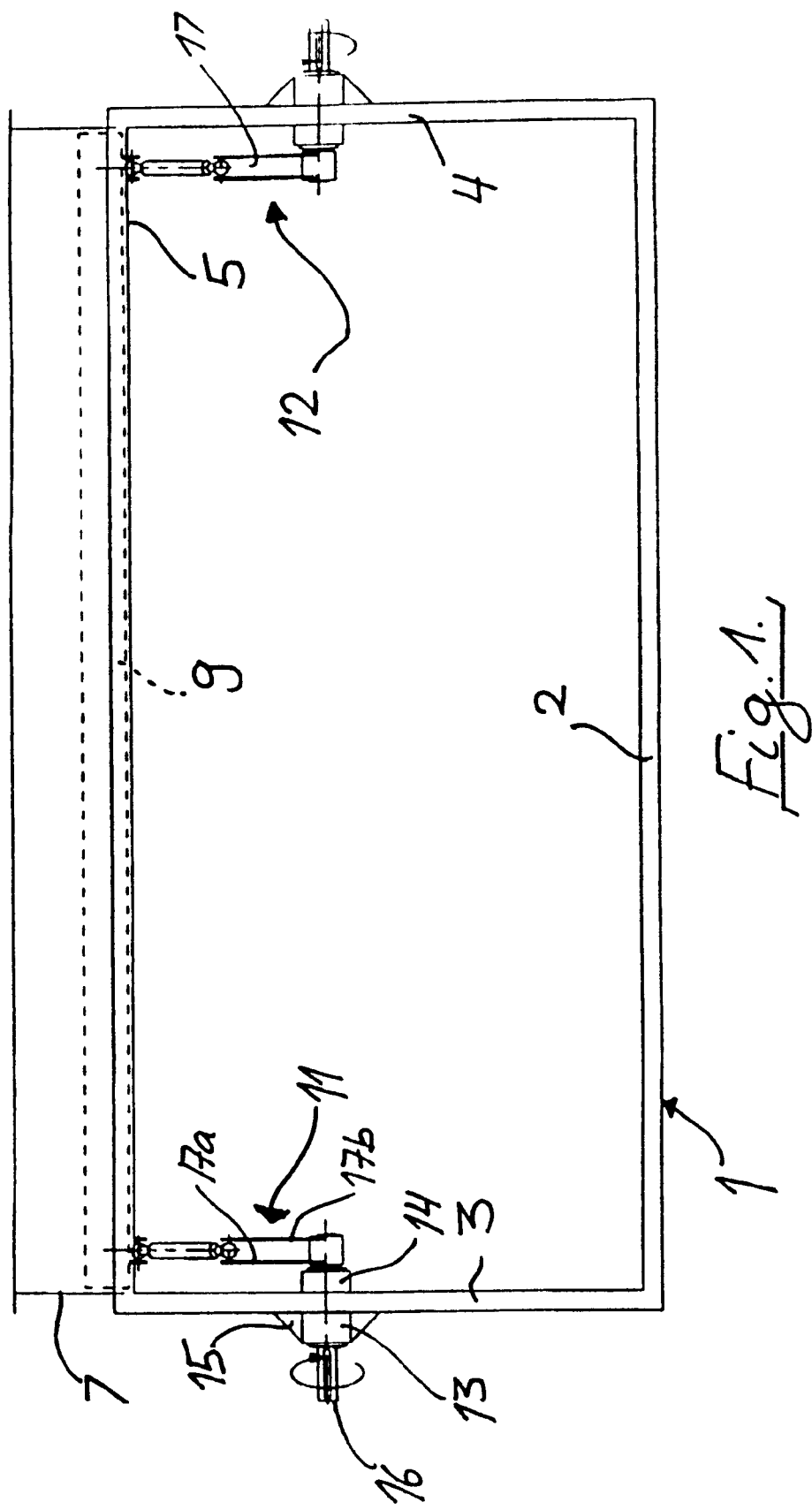
FIG. 1 is a cross-sectional view, transverse to the direction of flow, through the housing of one exemplary embodiment of an inventive valve, in the form of a switch-over valve, with the wing being disposed in the position in which the bypass channel is closed.

The valve of the present invention is characterized primarily in that a respective drive shaft driver is mounted in the side walls of the housing and each passes through a respective one of the side walls, in that the fixating lever of a given one of the fixating lever assemblies is secured to the inwardly disposed end of a respective driver, and in that a rotary drive mechanism engages the outwardly disposed end of the driver.

With the inventive valve, the average loss is considerably reduced since no internal drive shaft passes through the cross section of the channel, either in the region of the operating channel or of the bypass channel.

Since with the inventive valve the fixating lever assemblies are disposed entirely on the outside in the vicinity of the side walls, the wings must be more rigid in order to maintain the same flexure values, which have a considerable influence upon the sealing tightness of the valve in the closure position.

Whereas with a switch-over valve the wing can in one of the closure positions be disposed in a pocket formed in the channel connection, it is necessary when designing the valve as a simple shut off valve that the adjoining channel be widened on one side in order to provide a pocket for the wing in the open position of the valve.

Further specific features of the present invention will be described in detail subsequently.

DESCRIPTION OF PREFERRED EMBODIMENTS

Referring now to the drawings in detail, the housing 1 of the valve has a base 2, two oppositely disposed side walls 3 and 4, and a top or cover 5. As can be seen from FIGS. 1 and 2, downstream of the entering gas flow A there are provided on the housing 1 a channel connection 6 for an operating channel, and on the upper side a channel connection 7 for a bypass channel.

Figure 2:
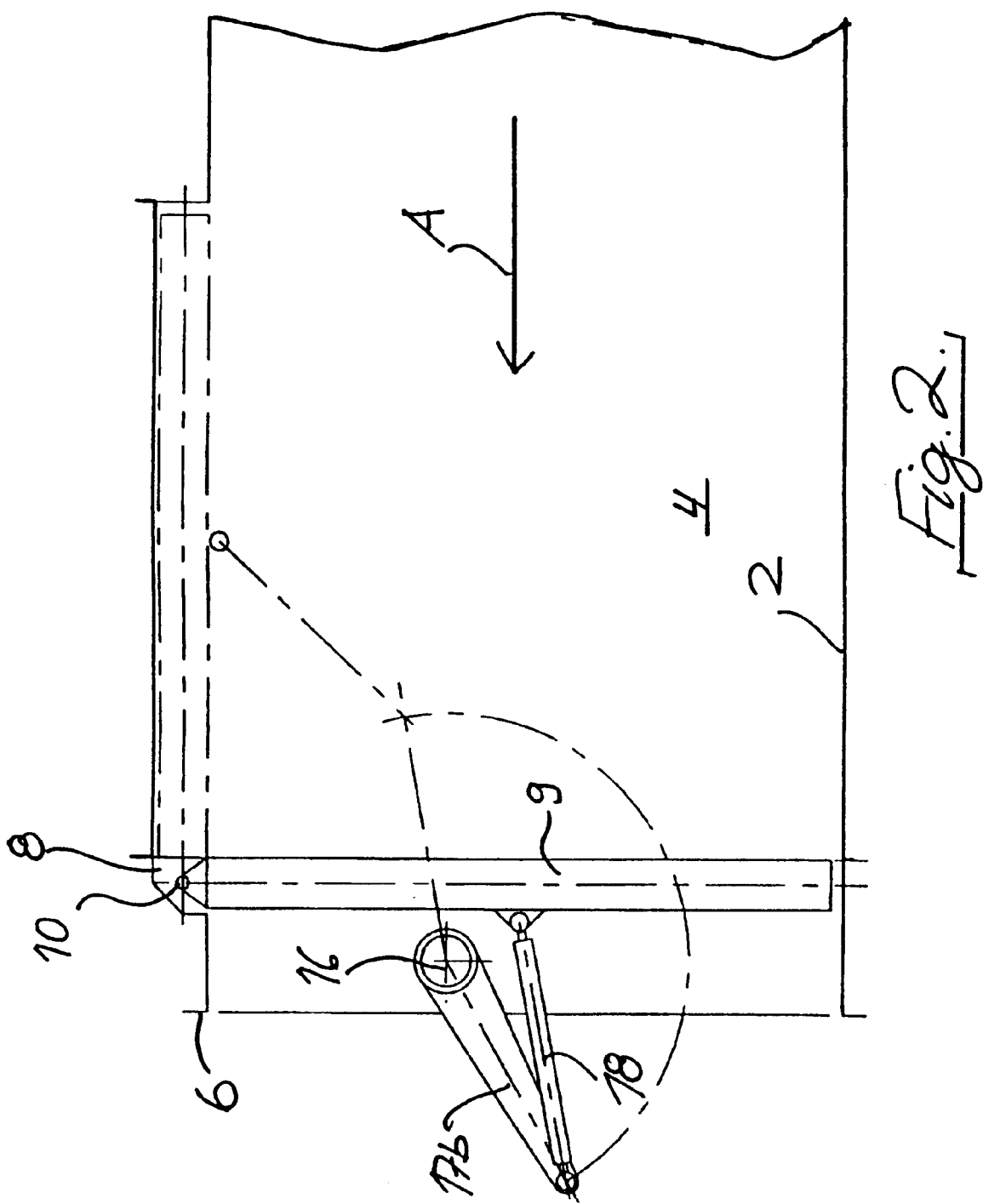
FIG. 2 is a longitudinal section through the housing, with the wing being disposed in the position in which the operating channel is closed and the bypass channel is open.

In a pocket 8 provided on the bypass channel, a wing or blade 9 is pivotably mounted about a horizontal hinge or articulation shaft 10 in such a way that the wing 9 is pivotable between the closure position shown in FIG. 2 for closing the operating channel, and the position shown in FIG. 1 for closing the bypass channel; in this connection, the wing 9 is pivotable about approximately 90°. Inclined positions of the wing 9, for example, approximately 30°, are also possible for enhancing flow and for reducing pressure loss.

For pivoting the wing 9 about the articulation shaft 10, two fixating lever assemblies 11 and 12 are provided in the interior of the housing on the two oppositely disposed side walls 3 and 4. Welded or otherwise secured to the walls are a respective outer journal means 13 and a respective inner journal means 14; the outer journal means 13 is additionally supported against its respective wall by means of support plates 15. A driver 16 passes through the two journal means 13, 14 and the wall. Secured on the inner end is a fixating lever 17 having two lever arms 17a and 17b. Pivotably disposed between the free ends of the two lever arms 17a and 17b is a fixation or link rod 18, the other end of which is pivotably connected to the wing 9.

The driver 16 should be pivotable in the direction of the rotation arrow illustrated in FIG. 1.

For this purpose, the arrangement shown in FIGS. 3*a* and 3*b* is suitable. Hydraulically or pneumatically actuatable piston/cylinder drive mechanisms 19 are pivotably connected to the wall, or to some other support structure, on the outer side. Secured to the free end of the driver 16 is a lever arm 21, the free end of which is pivotably connected to the piston rod 20. This arrangement can serve for a pivoting of the drive about, for example, 135°.

The piston/cylinder drive mechanisms 19 are connected via lines 19*a* and 19*b*, and a control valve 19*c*, with a pressure source 19*d* and a shunt 19*e*.

With the arrangement illustrated in FIG. 4, worm gears or drives 22 are placed upon the outer ends of the driver 16. These worm drives can be driven (in a torque branching manner) by an electric motor 23 via a branching gear mechanism 24, drive or Cardan shafts 25, miter gears 26, and drive or Cardan shafts 27.

The specification incorporates by reference the disclosure of German priority document 100 19 686.1 of Apr. 20, 2000. The present invention is, of course, in no way restricted to the specific disclosure of the specification and drawings, but also encompasses any modifications within the scope of the appended claims.

What I claim is:

1. A switch-over valve for large channel cross sections, comprising:

a housing having channel connections and side walls;

a wing disposed in said housing and pivotably mounted thereto:

two fixating lever assemblies mounted on opposite ones of said side walls of said housing for moving said wing, each of said assemblies including at least one fixating lever and one link rod, one end of which is pivotably connected with the fixating lever while the other end is pivotably connected with the wing;

a respective driver for each of said fixating lever assemblies, wherein each driver passes through one of said side walls from outside said housing, wherein an inner end of each driver is connected to said fixating lever of a given one of said fixating lever assemblies; and a rotary drive mechanism that engages an outer end of each of said drivers outside of said housing.

2. A valve according to claim 1, wherein each rotary drive mechanism comprises a piston/cylinder drive mechanism and a rod member having one end pivotably connected to a driver and another end pivotably connected to a free end of a piston rod of said piston/cylinder drive mechanism.

3. A valve according to claim 2, wherein a common control valve is provided for controlling said piston/cylinder drive mechanisms.

4. A valve according to claim 1, wherein said rotary drive mechanisms are provided with gear mechanism that are secured to outer ends of said drivers and are driveable by an electro drive mechanism via a mechanical torque branching arrangement.

* * * * *